US006763418B1

(12) United States Patent
Chou et al.

(10) Patent No.: US 6,763,418 B1
(45) Date of Patent: Jul. 13, 2004

(54) REQUEST BUS ARBITRATION

(75) Inventors: Norman C. Chou, San Jose, CA (US); Yolin Lih, San Jose, CA (US); Mercedes Gil, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 498 days.

(21) Appl. No.: 09/948,925

(22) Filed: Sep. 7, 2001

(51) Int. Cl.$^7$ .......................... G06F 13/36; H04L 12/54
(52) U.S. Cl. .................. 710/317; 370/462; 340/825.5
(58) Field of Search ....................... 710/317, 62, 241, 710/52, 113, 28, 240, 316; 340/825.5, 2.1; 712/33; 370/412, 389, 416, 400, 462, 351, 431, 422; 709/218, 238

(56) References Cited

U.S. PATENT DOCUMENTS

| | | | |
|---|---|---|---|
| 5,418,967 A | * 5/1995 | Simcoe et al. .............. 710/241 |
| 5,450,549 A | * 9/1995 | Casparian ................... 345/556 |
| 5,615,161 A | 3/1997 | Mu |
| 5,644,604 A | 7/1997 | Larson |
| 5,710,549 A | * 1/1998 | Horst et al. .............. 340/825.5 |
| 5,740,346 A | 4/1998 | Wicki et al. |
| 5,768,300 A | 6/1998 | Sastry et al. |
| 5,838,684 A | 11/1998 | Wicki et al. |
| 5,892,766 A | 4/1999 | Wicki et al. |
| 5,931,967 A | 8/1999 | Shimizu |
| 5,959,995 A | 9/1999 | Wicki et al. |
| 5,987,629 A | 11/1999 | Sastry et al. |
| 5,991,296 A | 11/1999 | Mu et al. |
| 6,003,064 A | 12/1999 | Wicki et al. |
| 6,314,487 B1 | * 11/2001 | Hahn et al. ................. 710/317 |
| 6,628,662 B1 | * 9/2003 | Blackmon et al. .......... 370/447 |

OTHER PUBLICATIONS

"A comprehensive modeling for performance evaluation of regular interconnection network" by Chen, C.C.-Y and Hee Yong Youn (absrrct only).*
"A comprehensive performance evaluation of crossbar networks" by Youn, H. Y. and Chen, C. C. —Y (abstract only).*
"InfiniBand Switch Chip Runs at 10 Gbps On Eight Ports", Nicholas Cravotta, Nov. 8, 2001, EDN, 1 page.*
"Assemble Fast Switch Fabrics With 32–Port InfiniBand Node p. 60", Electronic Design, Oct. 15, 2001, 4 pages.*
"RedSwitch, Inc. Announces Industry's Highest Performance and Highest Integration InfiniBand Switch Chip", RedSwitch Press Release, Oct. 16, 2001, 2 pages.*
"RedSwitch Gearing Up To Launch New Chip", Steve Tanner, Silicon Valley Business Ink, Oct. 26, 2001, 3 pages.*
"Mellanox Integrates Serdes Into Infiniband Switch", Jerry Ascierto, EE Times Oct. 23, 2001, 3 pages.*
"Switch Chip Expands InfinBand Integration", EEM file 3130, Tony Chance, 2 pages.*
"RedSwitch Announces 16 Gbyte/s Throughout Switch Product for RapidIO Architcture", RedSwitch Press Release, Milpitas, Calif., May 15, 2001, Tony Chance, 2 pages.*
"RedSwitch and Agilent Technologies Unveil 160–GB/s Throughout Switch Product for InfiniBand Architecture", RedSwitch Press Release, Intel Developer Forum Conference, San Jose, Calif., Feb. 27, 200a, Mark Alden–Agilent, Tony Chance–RedSwitch, 2 pages.*
InfiniBand™Architecture Specification Vol. 1, Release 1.0; Oct. 24, 2000; (880 pages).

* cited by examiner

Primary Examiner—Gopal C. Ray

(57) ABSTRACT

A method and system to arbitrate requests of a plurality of ports of an interconnect device are provided. Every port receives combined pending request data that includes a pending request indicator associated with each of the plurality of ports. Each pending request indicator specifies whether a corresponding port has a pending request that needs to be submitted to a request bus of the interconnect device. Further, at each port, a turn to submit a request to the request bus is allocated to one of the plurality of ports based on the combined pending request data, a set of values stored in a mask register and a priority scheme associated with the plurality of ports.

43 Claims, 12 Drawing Sheets

REQUEST BUS ARBITRATION

FIELD OF THE INVENTION

The present invention relates generally to the field of data communications and, more specifically, to controlling access of multiple ports to a crossbar resource of an interconnect device.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few. The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

According to one aspect of the present invention, there is provided a method to arbitrate requests of a plurality of ports of an interconnect device. Every port receives combined pending request data that includes a pending request indicator associated with each of the plurality of ports. Each pending request indicator specifies whether a corresponding port has a pending request that needs to be submitted to a request bus of the interconnect device. Further, at each port, a turn to submit a request to the request bus is allocated to one of the plurality of ports based on the combined pending request data, a set of values stored in a mask register and a priority scheme associated with the plurality of ports.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus to arbitrate between resource requests of a plurality of ports in an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Mask-based Round Robin Arbitration

A traditional round-robin arbitration technique uses a FIFO (first-in first-out) circular queue where resource requests of multiple participants are kept. The arbiter goes around this queue, processing a request of each participant during a time interval of one quantum (i.e., a predefined unit of time). If the request is still being processed at the end of the quantum, the processing is interrupted and the request is added to the tail of the queue. A request of a new participant is also added to the tail of the queue. Although this technique provides fairness to all participants, it cannot facilitate priority scheduling.

Figure 3:
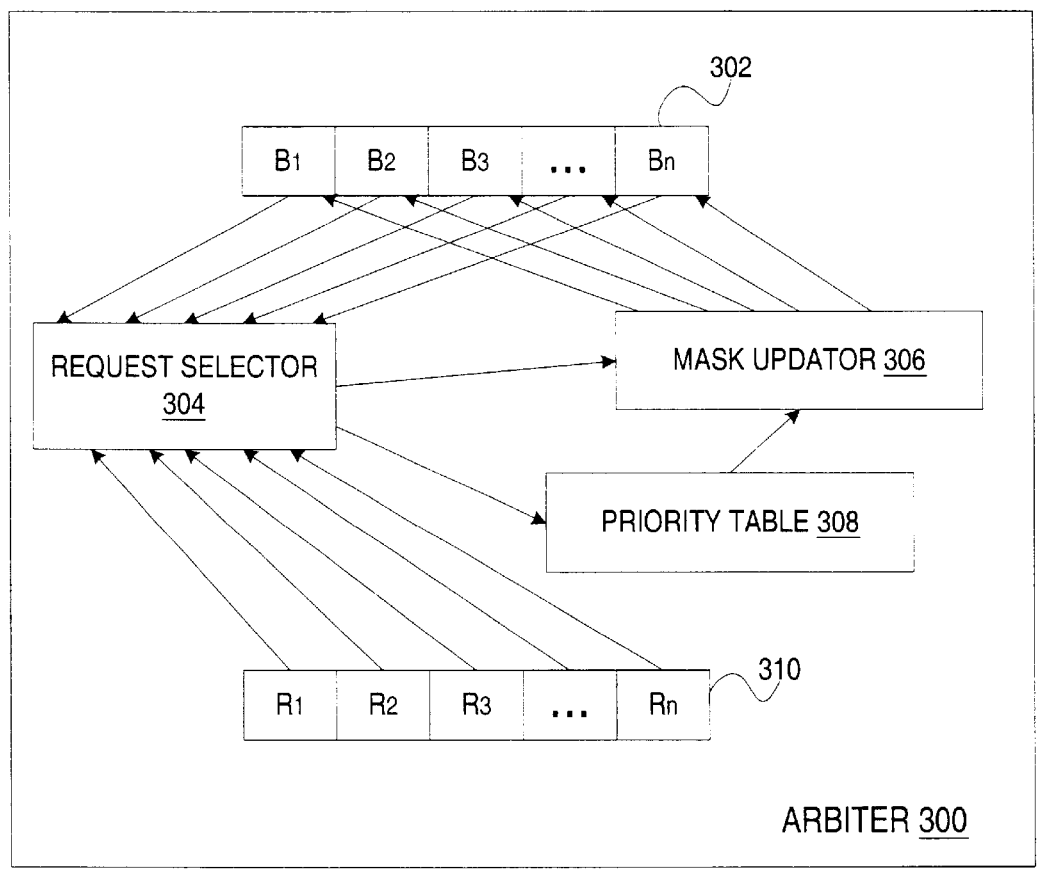
FIG. 3 is a block diagram illustrating the conceptual architecture of an arbiter, according to one embodiment of the present invention.

Mask-based round robin arbitration enforces the priority scheduling while maintaining fairness to all participants. FIG. 3 is a block diagram illustrating the conceptual architecture of a mask-based arbiter, according to one embodiment of the present invention.

Referring to FIG. 3, arbiter 300 arbitrates between multiple requests placed in a queue 310. Queue 310 accommodates requests issued by requestors $r_1$ through $r_n$. Requestors $r_1$ through $r_n$ may represent runnable processes or tasks requiring the CPU time in a computer system, ports of an interconnect device requiring access to a resource of the interconnect device (e.g., a crossbar resource), etc. In one embodiment, each requestor is associated with a certain location within queue 310.

Arbiter 300 includes a mask register 302, a request selector 304 and a mask updator 306. Mask register 302 has the same number of bits $b_1$ through $b_n$ as the number of all potential participants in arbitration. For example, when arbiter 300 is used to allocate the CPU time to processes running in the computer system, the number of bits in the mask register is equal to the number of processes that can potentially compete for the CPU time. In another example, if arbiter 300 is used to allocate a crossbar resource to multiple ports within a switch, the number of mask register bits is equal to the number of ports in the switch.

Each bit in mask register 302 is associated with a particular requestor that may participate in arbitration. The value of every bit in mask register 302 indicates whether a corresponding requestor is qualified to participate in a current round of arbitration. For example, if bit $b_1$ in mask register 302 is set to 1, it means that requestor $r_1$ is disabled from further participation in the current round of arbitration. Alternatively, if bit $b_1$ in mask register 302 is set to 0, then requestor $r_1$ is qualified to participate in the current round of arbitration. A requestor gets disqualified from further participation in the current round of arbitration after it wins one arbitration in this round of arbitration. A round of arbitration begins when every requestor is qualified to participate in the arbitration and ends when all the requestors become disqualified.

Request selector 304 is responsible for identifying a winning request in each arbitration. A winning request is identified based on a priority associated with each requestor and the values stored in mask register 302. In one embodiment, request selector 304 identifies one or more requestors qualified to participate in the arbitration using the values stored in mask register 302, determines which of the qualified requestors have requests in queue 310, and then selects from these requestors a requestor associated with the highest priority. A request from queue 310 that is associated with the requestor having the highest priority is considered a winner of this arbitration. In one embodiment, a priority table 308 is used to determine a priority associated with each requestor. Alternatively, the priority scheme associated with requestors $r_1$ through $r_n$ is part of logic residing within request selector 304.

Mask updator 306 is responsible for updating the value of a bit associated with a winning requestor in mask register 302 each time request selector 304 selects a winner. For example, if request selector 304 determines that the winner of this arbitration is a request issued by requestor $r_1$, mask updator 306 sets bit $b_1$ to 1 in mask register 302 to disable further participation of requestor $r_1$ in the current round of arbitration. By the end of the current round of arbitration, all mask register bits associated with the participating requestors are set to 1. Before the next round of arbitration begins, mask updator 306 resets each bit in mask register 302 to its initial value. In one embodiment, mask updator 306 performs the reset during the last arbitration within the current round of arbitration. Alternatively, mask updator performs the reset after the completion of the current round of arbitration.

It should be noted that although arbiter 300 is shown to include four elements, arbiter 300 may include more or less than four elements to perform the functionality described above.

Figure 4:
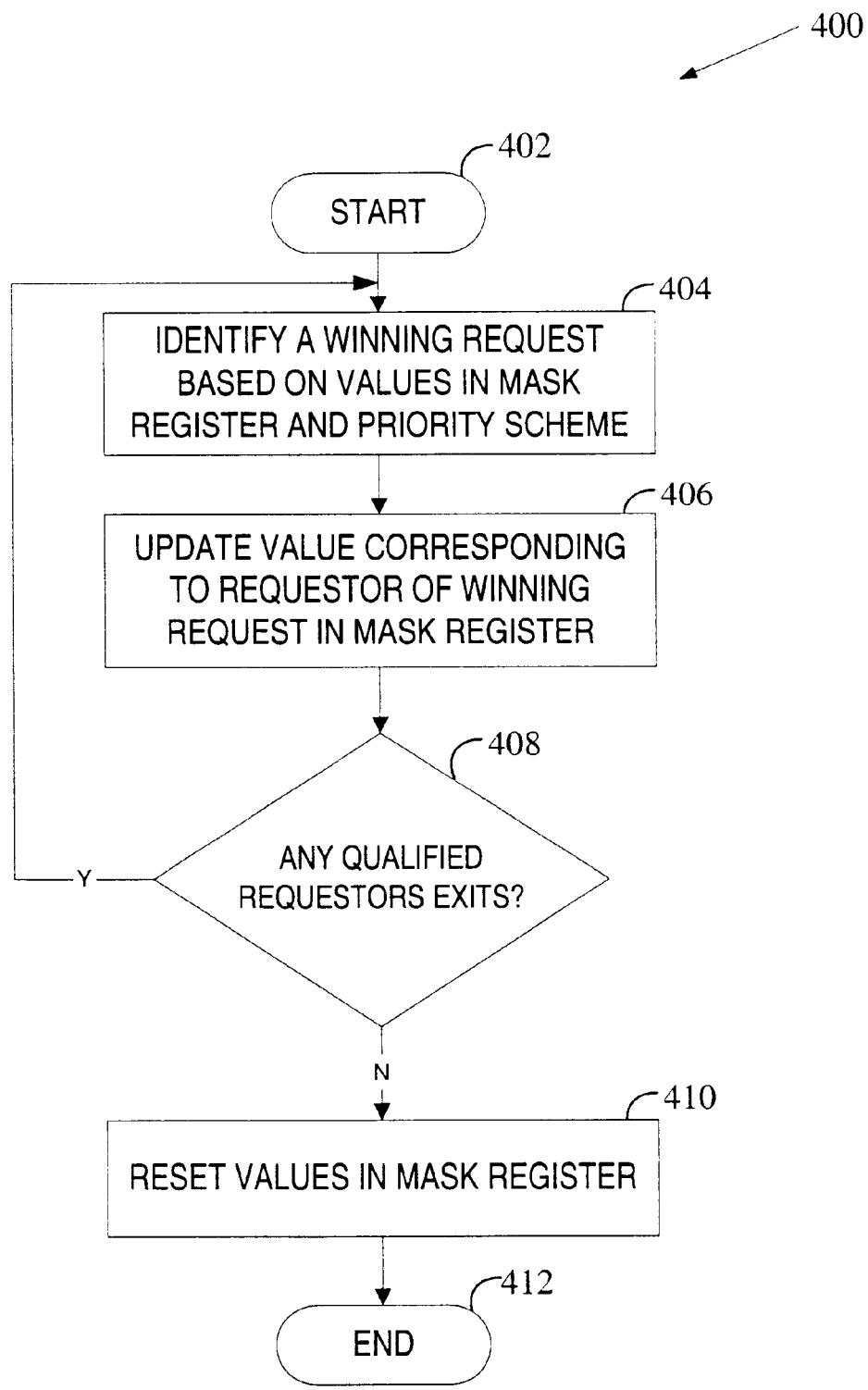
FIG. 4 is a flow diagram of one embodiment of a process for arbitrating between a plurality of requests.

FIG. 4 is a flow diagram of one embodiment of a process for arbitrating between a plurality of requests. The process may be performed by processing logic that may comprise hardware (e.g., circuitry, dedicated logic, etc.), software, or a combination of both.

Referring to FIG. 4, the arbitration process is performed one or more times within a round of arbitration. The number of arbitrations is equal to the number of requestors presenting requests during the current round of arbitration. Each requestor is qualified to present only one request during this round of arbitration. A round of arbitration begins when each participant is qualified to participate in the round of arbitration and ends when all participants become disqualified from the participation in this round of arbitration.

Every arbitration process begins with identifying a winning request based on a set of values stored in a mask register and a priority scheme associated with a requestor of the winning request (processing block 404). Each value in the mask register corresponds to a particular requestor that may wish to participate in arbitration. In one embodiment, the selection of the winning request includes identifying one or more requestors that are qualified to participate in the current round of arbitration based on the set of values in the mask register, determining which of the qualified requestors have pending requests, and then selecting from these requestors a requestor with the highest priority. In one embodiment, priorities of the requestors are determined using a predefined priority scheme.

At processing block 406, a mask register bit corresponding to a requestor of the winning request is updated to disqualify this requestor from further participation in the current round of arbitration. In one embodiment, an enable signal is sent to each bit in the mask register to allow the update of the mask register. The enable signal may be used to control the time of the update of the mask register and, accordingly, the time of the winning request's access to a desired resource thereby providing for synchronization between the arbitration process and other processes performed in the system.

At decision box 408, a determination is made as to whether any requestors wishing to participate in the current round of arbitration are qualified to do so. The determination is made using the values of the mask register and the pending requests kept in the queue. If the determination is positive, processing logic returns to processing block 404, and processing blocks 404 and 406 performed again. If the determination is negative, values in the mask register are reset to their initial values, allowing each requestor to participate in the next round of arbitration (processing block 410). In one embodiment, the values of the mask register are reset during the last arbitration of the current round of arbitration to avoid having an extra cycle between the completion of the current round of arbitration and the beginning of the next round of arbitration. In this embodiment, if only one requestor participates in arbitration and this requestor has multiple pending requests, its requests will be processed every other cycle to allow for an update of the mask register.

The mask-based round robin arbitration processes one request of each participant during a single round of arbitration. Accordingly, starvation problems are eliminated, fairness to all the participants is provided, and the requestors that have heavy loads of requests are penalized. In addition, a new request presented at any time during a current round of arbitration gets processed during this round of arbitration, without the need to wait for the next round of arbitration (unless the requestor of this new request has already won one arbitration during the current round of arbitration). Furthermore, the mask-based round robin arbitration enforces priority among the requests. For example, if a priority associated with a new request presented during a current round of arbitration is higher than priorities of other participating requests, the new request will be the winner of the next arbitration within the current round of arbitration.

Figure 5:
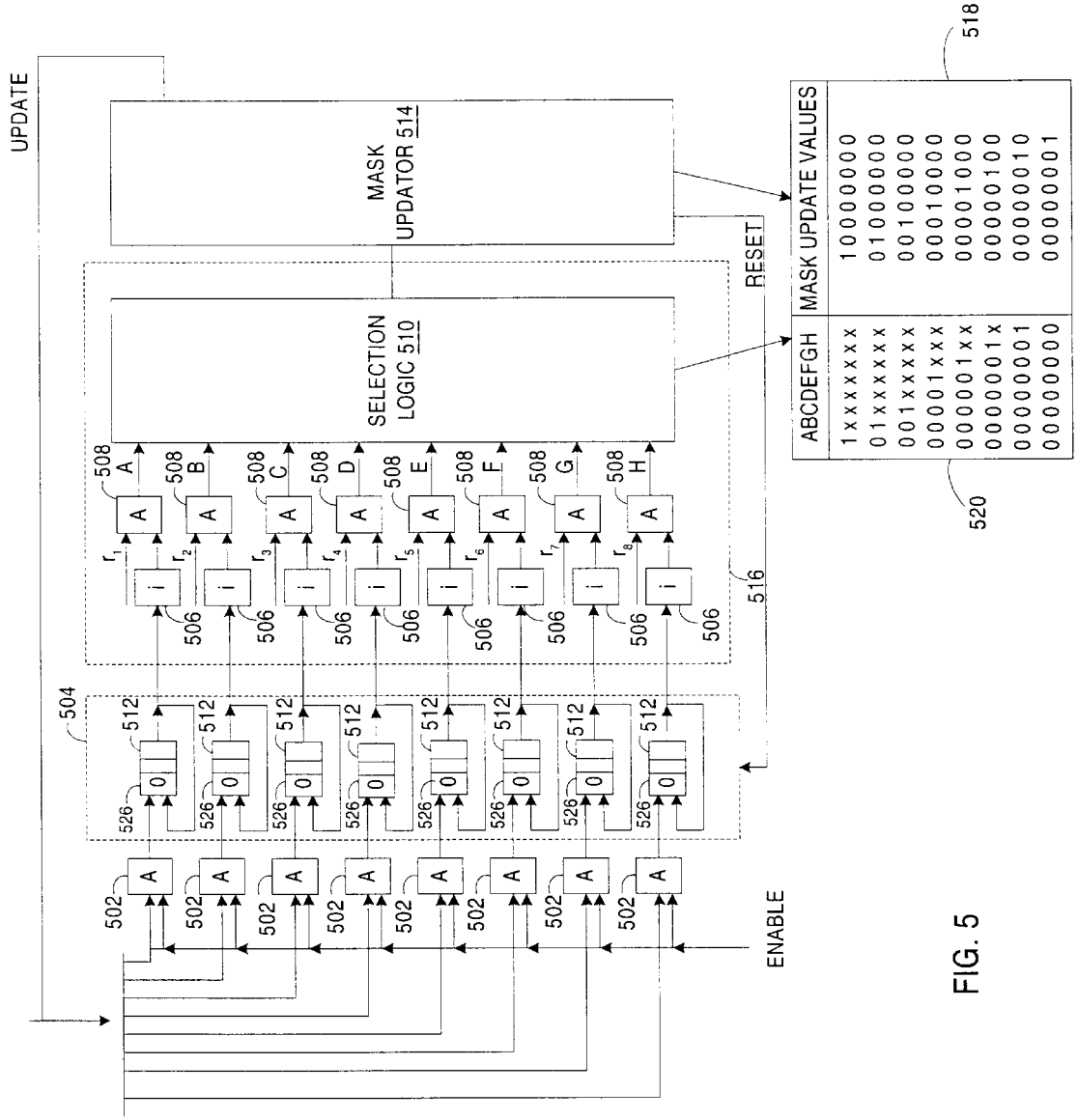
FIG. 5 is a block diagram illustrating an exemplary process flow for a mask-based round robin arbitration, according to one embodiment of the present invention.

FIG. 5 is a block diagram illustrating an exemplary process flow for mask-based round robin arbitration, according to one embodiment of the present invention. Referring to FIG. 5, a mask register 504 is coupled to a request selector 516 and a mask updator 514. Mask register 504 consists of eight bits corresponding to eight requestors $r_1$ through $r_8$. Each bit is coupled to an OR gate 526. Request selector 516 includes a set of inverters 506, a set of AND gates 508 and a selection logic 510. Each inverter 506 receives the value of a corresponding bit from mask register 504. Each AND gate 508 receives the output of the corresponding inverter 506 and a corresponding request value associated with one of requestors $r_1$ through $r_8$. The output of each AND gate 508 indicates whether the corresponding requestor is qualified to participate in this round of arbitration and has a pending request. Selection logic 510 receives this output and uses it to select the request with the highest priority using a fixed priority scheme such as, for example, a priority scheme 520. Priority scheme 520 specifies a winning request for each possible combination of qualified pending requests. For example, according to the first row, if requestor $r_1$ is qualified to participate in the current round of arbitration and has a pending request, $r_1$ will be the winner regardless of other qualified participants. According to the second row, if requestor $r_2$ is qualified to participate in the current round of arbitration and has a pending request while requestor $r_1$ is either not qualified to participate or does not have a pending request, $r_2$ will be the winner regardless of the remaining qualified participants, etc.

Mask updator 514 identifies the update values for mask register 504 based on the winner selected by selection logic 510 and a set of update values such as an exemplary set of update values 518. For example, if the winner of the arbitration is requestor r1, a set of values stored in a first row of table 518 is selected and sent to mask register 504. The winner is selected during one cycle and the mask register is updated during the next cycle. Once a corresponding bit in mask register 504 is set to 1, OR gate 526 coupled to this bit ensures that its value stays equal to 1 (regardless of other signals subsequently sent to this bit) until mask register 504 receives a reset signal.

Mask updator 514 is responsible for sending a reset signal to mask register 504 during a last arbitration of each round of arbitration. In one embodiment, each time a winner of arbitration is selected, mask updator 514 verifies whether any qualified pending requests remain to participate in the next arbitration of this round of arbitration. If at least one qualified pending request remains, mask updator 514 selects an appropriate set of update values and sends it to mask register 504. Alternatively, mask updator 514 generates a reset signal and sends it mask register 504. The reset signal resets each bit in mask register 504 to 0, thereby qualifying each participant $r_1$ through $r_8$ for participation in the next round of arbitration.

In one embodiment, mask register 504 cannot be updated until it receives an enable signal. The enable signal may be needed for synchronizing the arbitration process with other processes in the system as described in more detail above. In this embodiment, an update value sent to a corresponding bit of mask register 504 goes through an AND gate 502 which is also coupled to an outside enable logic. As a result, a mask register bit is updated only if its update value is sent concurrently with the enable signal.

As explained above, the mask-based round robin arbitration may be used to allocate the CPU time to various tasks and processes running in a computer system or any other device, to control access of various components of the interconnect device to a resource of an interconnect device, etc. For example, the mask-based round robin arbitration may be used to control access of multiple ports of the interconnect device to a crossbar resource (e.g., a request bus) of an interconnect device.

Request Bus Arbitration

Figure 1:
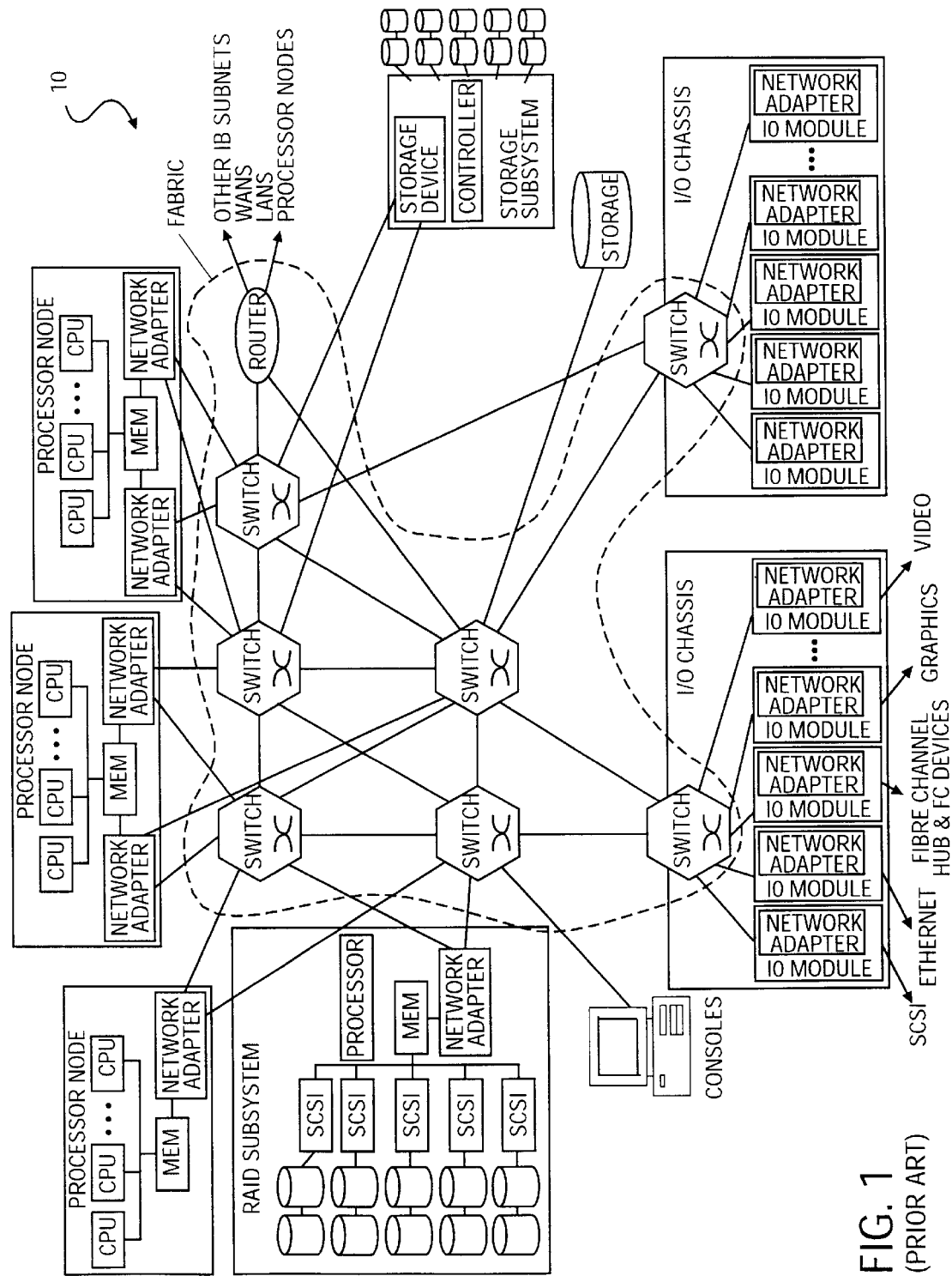
FIG. 1 is a diagrammatic representation of a System Area Network, according to the prior art, as supported by a switch fabric.
Figure 2A:
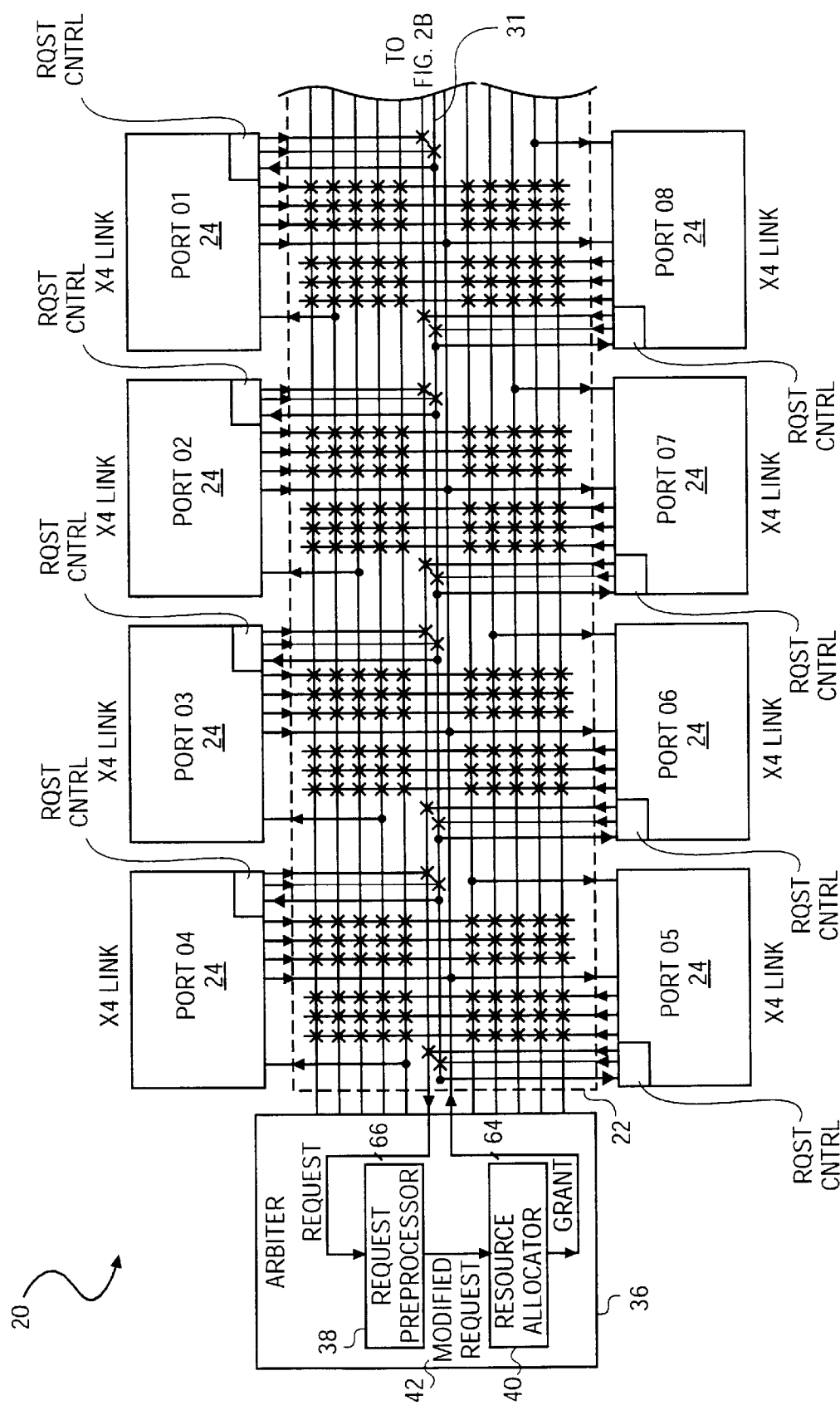
FIGS. 2A and 2B provide a diagrammatic representation of a data path, according to an exemplary embodiment of the present invention, implemented within an interconnect device (e.g., a switch).
Figure 2B:
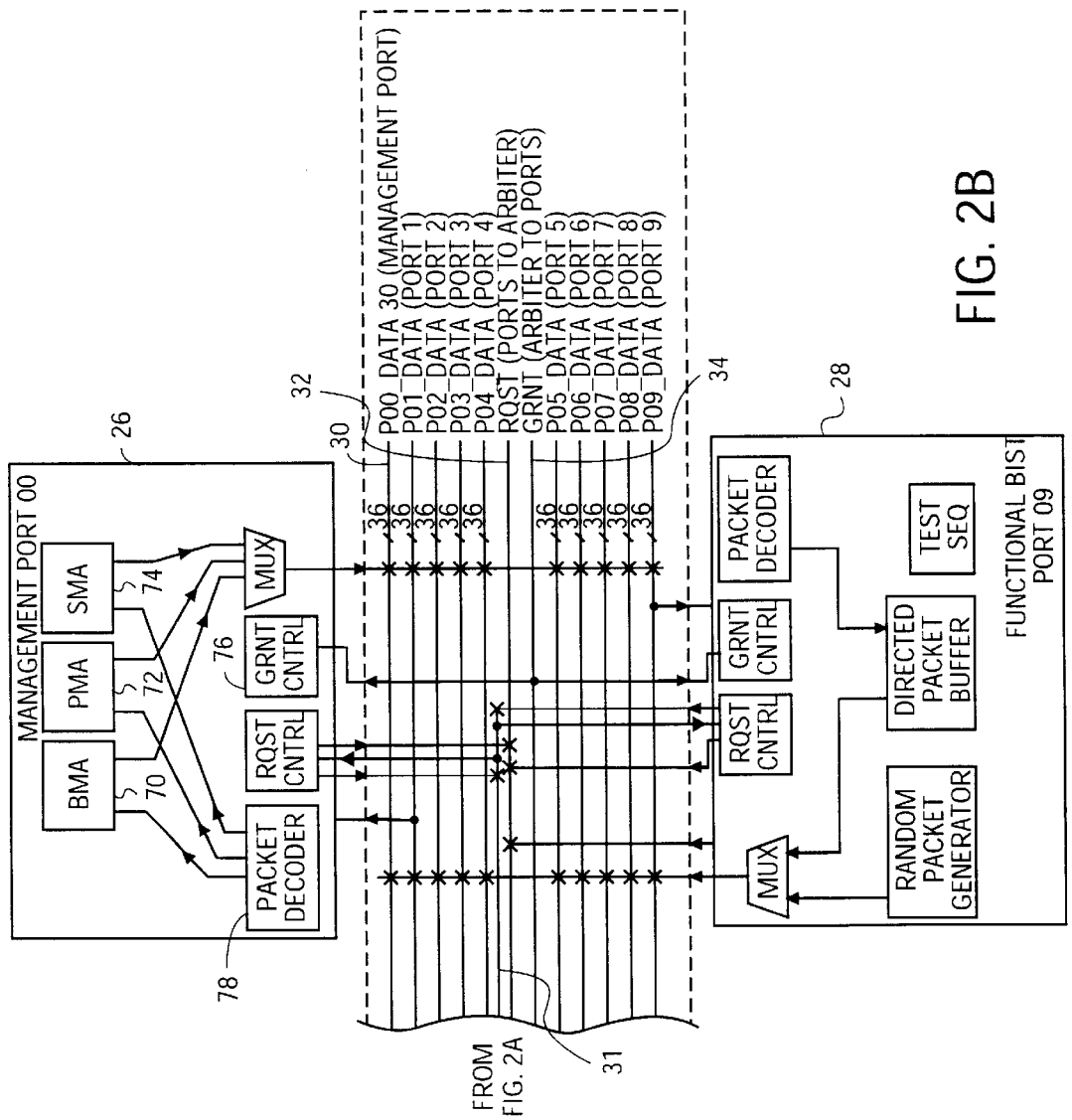

FIGS. 2A and 2B provide a diagrammatic representation of a datapath 20, according to an exemplary embodiment of the present invention, implemented within an interconnect device (e.g., a switch). Datapath 20 is shown to include a crossbar 22 that includes ten 36-bit data buses 30, a 66-bit request bus 32, a 10-bit pending request bus 31, and a 64-bit grant bus 34. Coupled to crossbar 22 are eight communication ports 24 that issue resource requests to an arbiter 36 via request bus 32, and that receive resource grants from arbiter 36 via grant bus 34.

Arbiter 36 includes a request preprocessor 38 to receive resource requests from request bus 32 and to generate a modified resource request 42 to a resource allocator 40. Resource allocator 40 then issues a resource grant on grant bus 34.

In addition to the eight communication ports, a management port 26 and a functional Built-In-Self-Test (BIST) port 28 are also coupled to crossbar 22. Management port 26 includes a Sub-Network Management Agent (SMA) 74 that is responsible for network configuration, a Performance Management Agent (PMA) 72 that maintains error and performance counters, a Baseboard Management Agent (BMA) 70 that monitors environmental controls and status, and a microprocessor interface. Functional BIST port 28 supports stand-alone, at-speed testing of an interconnect device embodying datapath 20. Functional BIST port 28 includes a random packet generator, a directed packet buffer and a return packet checker.

Each port (including eight communication ports 24, management port 26 and functional BIST port 28) contains a request controller to control the submission of resource requests to request bus 32 by the ports as will be described in greater detail below.

Figure 6:
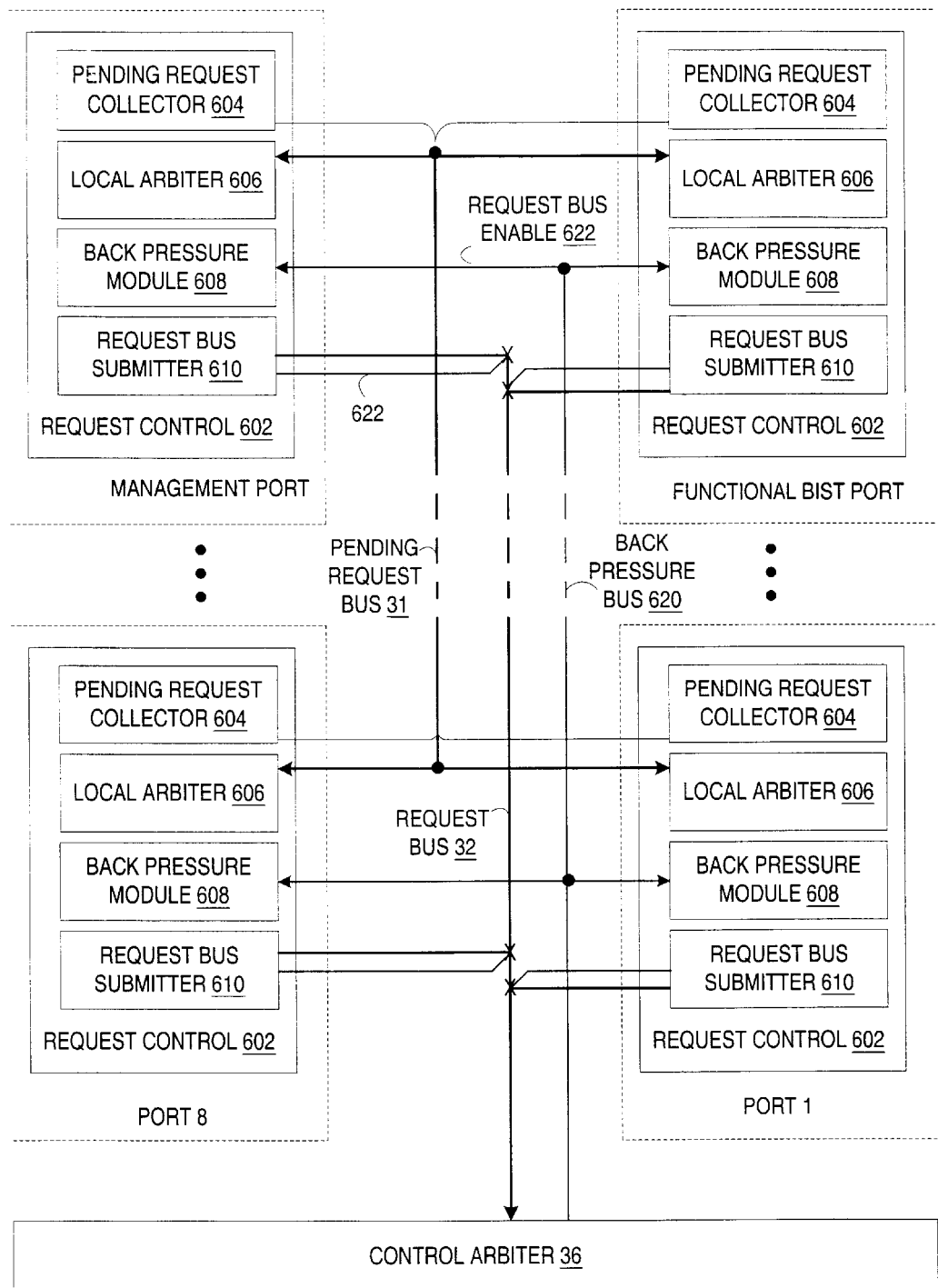
FIG. 6 is a block diagram illustrating request bus arbitration, according to one embodiment of the present invention.

FIG. 6 is a block diagram illustrating request bus arbitration, according to one embodiment of the present invention. In the interconnect device, multiple ports may require access to request bus 32 at the same time to issue resource requests to central arbiter 36. To avoid overflowing request bus 32 with resource requests, a request controller 602 residing in each port of the interconnect device manages the ports' access to request bus 32.

In one embodiment, request controller 602 includes a pending request collector 604 and a local arbiter 606. Pending request collector 604 generates a pending request indicator and submits it to a pending request bus 31. The pending request indicator specifies whether this port has a pending resource request that needs to be submitted to request bus 32 for transfer to central arbiter 36. In one embodiment, a port has a single queue of resource requests. Then, a pending request indicator indicates whether this queue has at least one pending request. Alternatively, a port may have two or more queues. Then, a pending request indicator generated by pending request collector 604 indicates whether at least one of these queues has a pending request. Pending request bus 31 receives a pending request indicator from each port and delivers the resulting set of pending request indicators to local arbiter 606 of each port.

In one embodiment, local arbiter 606 includes a mask register that stores a set of values. Each value in the mask register corresponds to a particular port and indicates whether this port is qualified to participate in arbitration. A port becomes disqualified from the participation in a round of arbitration after winning one arbitration within this round of arbitration. When it happens, a corresponding bit in the mask register is updated to reflect a change in the status of this port. Local arbiter 606 arbitrates between requests issued by multiple ports using the set of pending request indicators received from pending request bus 31, the current set of values stored in the mask register and a priority scheme associated with the multiple ports of the interconnect device. The priority scheme may be defined based on various factors. For example, the priority scheme may be defined based on the type of resource requests issued by each port. In one embodiment, when local arbiter 606 allocates a turn to a selected port, a mask register value corresponding to the selected port is updated.

In one embodiment, central arbiter 36 issues back pressure/no-back pressure indicators to each port via a back pressure bus 32. A back pressure indicator indicates whether central arbiter 36 requests each port to stop submitting resource requests to central arbiter 36. For example, during a multi-tasking operation, central arbiter 36 may not be able to grant any resource requests issued by the ports because all resources of the interconnect device are involved in this operation. In this embodiment, request controller 602 of each port includes a back pressure module 608 to control local arbitration based on the back pressure indicator received at the port. In one embodiment, back pressure module 608 uses an enable port of local arbiter 606 to prevent the update of the mask register and subsequent arbitration during the back pressure. In other embodiments, local arbiter 606 does not have an enable port in its design. In this case, in one embodiment, back pressure module 608 ensures that that local arbiter 606 halts arbitration during the back pressure. Alternatively, back pressure module 608 ensures that during the back pressure, the results of arbitration are ignored at corresponding ports and winning requests are not submitted to request bus 32 during.

In one embodiment, request controller 602 also includes a request bus submitter 610 that controls the transfer of a winning request to central arbiter 36 via request bus 32. In one embodiment, when the winning request is submitted to request bus 32, it does not get transferred over request bus 32 until request bus 32 is activated by a request bus enable signal 622. In one embodiment, request bus enable signal 622 is generated when two conditions are satisfied: (1) the winning request is loaded into a flip-flop to be sent to central arbiter 36 and (2) a no-back pressure indicator is received from central arbiter 36.

It should be noted that blocks 604 through 610 are shown to demonstrate the functionality of request controller 602, rather than the actual elements of request controller 602. That is, although request controller 602 is shown to include four blocks, more or less than four elements may be included in request controller 602 to perform the functionality described above.

Figure 7:
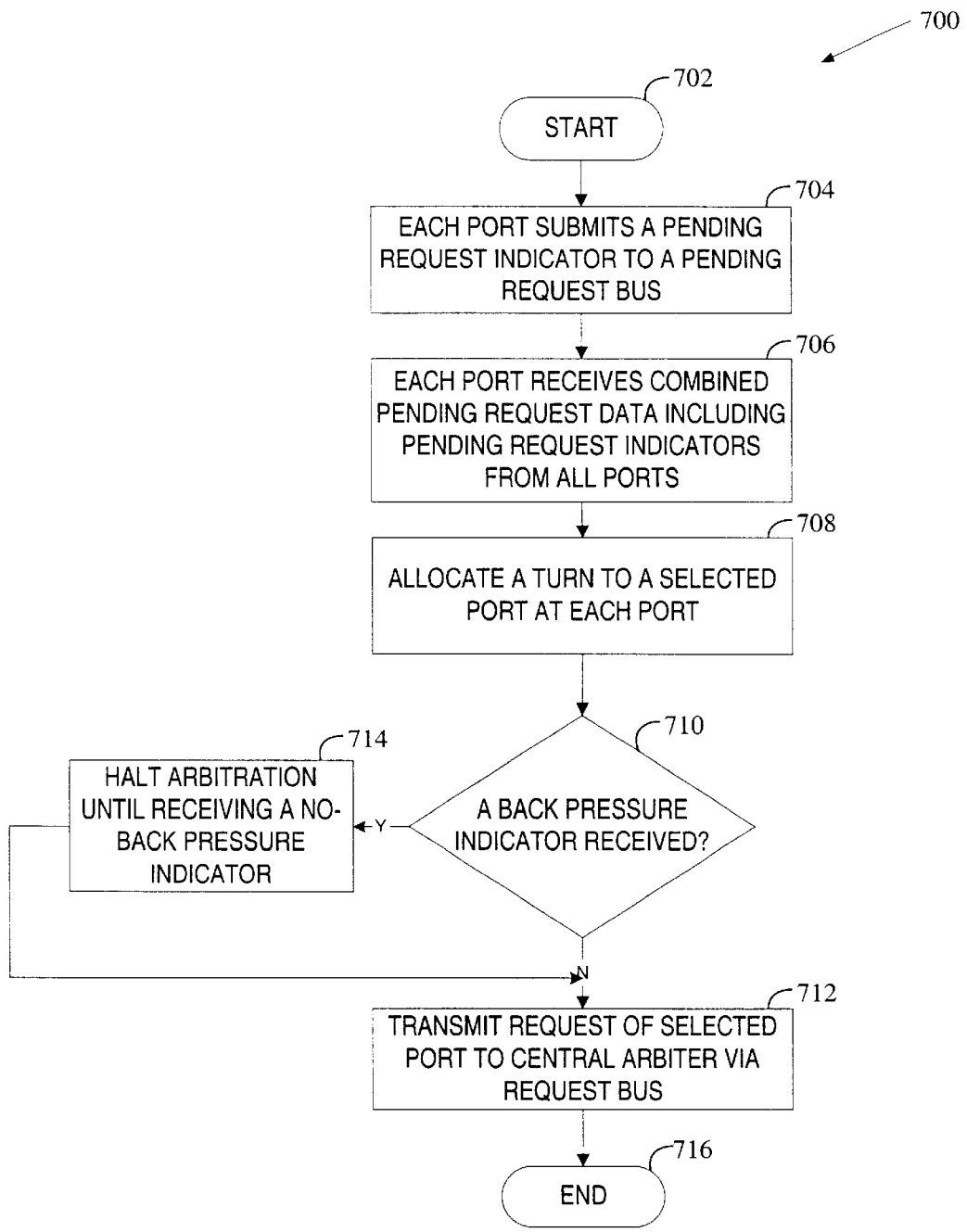
FIG. 7 is a flow diagram of one embodiment of a process for arbitrating requests of a plurality of ports within an interconnect device.

FIG. 7 is a flow diagram of one embodiment of a process for arbitrating requests of a plurality of ports within an interconnect device. The process may be performed by processing logic that may comprise hardware (e.g., circuitry, dedicated logic, etc.), software, or a combination of both.

Referring to FIG. 7, process 700 begins with submitting a pending request indicator to a pending request bus by each port (processing block 704). The pending request indicator specifies whether this port has a pending request that needs to be submitted to a request bus of the interconnect device. At processing block 706, processing logic in each port receives combined pending request data from the pending request bus. The combined pending request data includes pending request indicators from all the ports. At processing block 708, processing logic in each port arbitrates between the requests of participating ports and allocates a turn to one of the participating ports based on the combined pending request data, a set of values stored in a mask register and a priority scheme associated with the plurality of ports.

Further, in one embodiment, a determination is made at each port as to whether a back pressure indicator has been received from a central arbiter (decision box 710). If the determination is positive, in one embodiment, processing logic in each port halts the arbitration of the ports' requests until a no-back pressure indicator is received from the central arbiter. In one embodiment, in which the mask register cannot be updated until receiving an enable signal, processing logic refrains from sending the enable signal to the mask register until receiving a no-back pressure indicator, thereby preventing the update of the mask register during this time. In one embodiment, the enable signal also triggers, at the selected port, loading of the winning request into a flip-flop for transfer to the central arbiter via the request bus. In this embodiment, the lack of the enable signal will also prevent the loading of the winning request into the flip-flop.

In an alternative embodiment, if the back pressure signal is received, processing logic in each port does not prevent arbitration. Instead, processing logic in the selected port ensures that the request winning the arbitration does not get transferred to the central arbiter. In one embodiment, this is accomplished by processing logic refraining from sending a request bus enable signal to the request bus as described in more detail above.

When a no-back pressure indicator is received, processing logic in each port updates a mask register bit corresponding to the selected port and then processing logic in the selected port submits the winning request to the request bus for transfer to the central arbiter (processing block 712).

In one embodiment, one or more of the ports in the interconnect device include multiple queues to store pending requests. For example, in an IBA switch, a management port (e.g., management port 26 of FIG. 2B) includes several agents. Each agent generates resource requests and keeps them in a separate queue. In such a port, two levels of arbitration are performed as will be described in more detail below.

A Two-level Arbitration System

Figure 8:
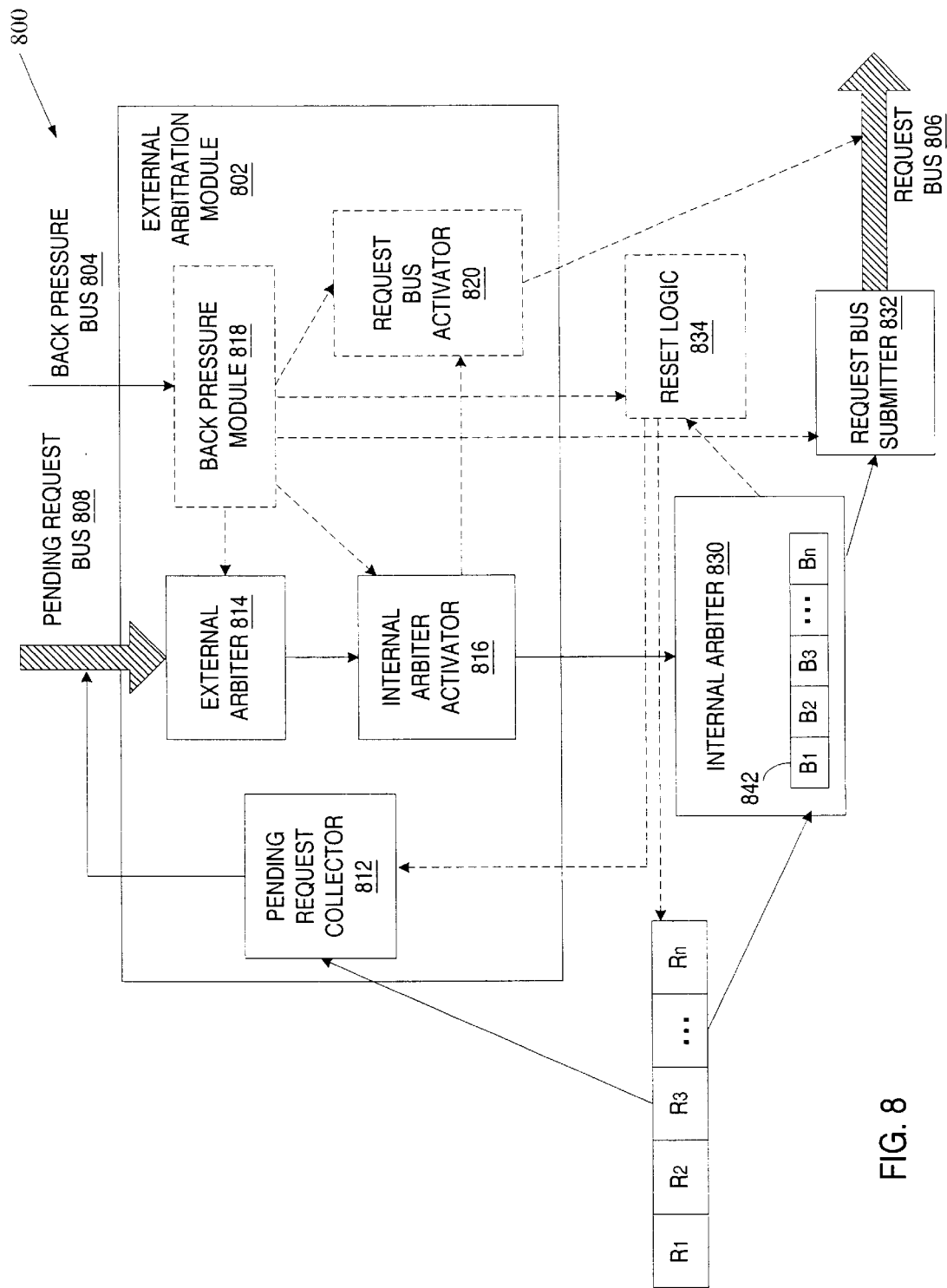
FIG. 8 is a block diagram of one embodiment of a two-level arbitration system associated with a port of an interconnect device.

FIG. 8 is a block diagram of one embodiment of a two-level arbitration system associated with a port of an interconnect device. As described above, a two-level arbitration system may be used in a port having multiple internal requestors that issue resource requests to a central arbiter of the interconnect device. An example of such a port is a management port of an IBA switch. One embodiment of an arbitration system associated with a management port will be described in greater detail below in conjunction with FIG. 10.

Referring to FIG. 8, arbitration system 800 includes an internal arbiter 830, an external arbitration module 802, and a request bus submitter 832. Internal arbiter 830 is responsible for arbitrating between pending requests of internal requestors $r_1$ through $r_n$. Requestors $r_1$ through $r_n$ may represent, for example, multiple agents residing in the port, multiple software applications running in the port, etc. Internal arbiter 830 arbitrates between the pending requests using a set of values stored in a mask register 842 and a priority scheme associated with the internal requestors. In one embodiment, each value of mask register 842 corresponds to a particular requestor and indicates whether this requestor is qualified to participate in a current round of arbitration. A requestor is qualified to participate in the current round of arbitration until it wins one arbitration within this round of arbitration. The priority scheme used by internal arbiter 830 is predefined and may depend on various characteristics of requestors $r_1$ through $r_n$ (e.g., types of requests issued by requestors $r_1$ through $r_n$).

External arbitration module 802 is a part of a distributed arbitration scheme for performing request bus arbitration within the interconnect device. External arbitration module 802 arbitrates between requests of participating ports and notifies the internal arbiter 816 when its own port is allocated a turn to submit a resource request to a request bus 806. In response, the internal arbiter transfers the resource request winning the internal arbitration to request bus submitter 832 for transfer to a central arbiter of the interconnect device via request bus 806.

In one embodiment, external arbitration module 802 includes a pending request collector 812, an external arbiter 814 and an internal arbiter activator 816. Pending request collector 812 determines whether any of the internal requestors $r_1$ through $r_n$ have pending requests and sends a pending request indicator associated with requestors $r_1$ through $r_n$ to a pending request bus 808. External arbiter 814 receives combined pending request data including pending request indicators of all the ports from the pending request bus, arbitrates between the pending requests of the participating ports, and generates data identifying the winner of the arbitration. In one embodiment, external arbiter 814 uses a mask-based round robin arbitration technique. In other embodiments, external arbiter 814 uses any other arbitration techniques known in the art.

Internal arbiter activator 816 receives the data identifying the winner of the arbitration and determines whether its own port is a winner of the external arbitration. When this determination is positive, internal arbiter activator 816 sends an enable signal to internal arbiter 816.

Internal arbiter 830 may use any arbitration technique known in the art. In one embodiment, internal arbiter 830 uses a mask-based round robin arbitration technique. In this embodiment, internal arbiter 830 arbitrates during one cycle and then updates the mask register during the next cycle. In one embodiment, internal arbiter 830 selects a winning resource request and then awaits an enable signal from the internal arbiter activator 816. Upon receiving the enable signal, internal arbiter 830 updates mask register 842 and passes the winning resource request to request bus submitter 832. Request bus submitter then submits the winning resource request to request bus 806. This operation is carried out in a pipeline fashion until the current round of arbitration ends. In one embodiment, internal arbiter 830 triggers a new round of arbitration by sending a reset signal to mask register 842, thereby re-qualifying all internal requestors $r_1$ through $r_n$ for participation in a new round of arbitration. In one embodiment, each time internal arbiter 830 receives the enable signal from internal arbiter activator 816, it determines whether the internal requestor that has won in the last internal arbitration is the only qualified requestor left to participate in the current round of arbitration. If the determination is negative, internal arbiter 830 updates the mask register bit corresponding to the winning requestor. Alternatively, if the determination is positive, internal arbiter resets mask register 842.

In one embodiment, external arbitration module 802 also includes a back pressure module 818 that receives a back pressure/no-back pressure indicator from the central arbiter via a back pressure bus 804 and sends this indicator to internal arbiter activator 816 and external arbiter 814. Upon receiving a back pressure indicator, internal arbiter activator 816 refrains from activating the internal arbiter until receiving a no-back pressure indicator from back pressure module 818. In one embodiment, in response to receiving the back pressure indicator, external arbiter 814 halts the external arbitration until back pressure module 818 sends a no-back pressure indicator. Alternatively, external arbiter 814 continues external arbitration and back pressure module 818 ensures that the resulting data identifying the winner of the external arbitration is ignored. In one embodiment, back pressure module 818 sends the back pressure indicator to internal arbiter activator 816, thereby stopping the submission of a winning resource request to request bus 806.

In one embodiment, external arbitration module 802 further includes a request bus activator 820 that is responsible for sending an enable signal to request bus 806. This enable signal is sent to trigger the transfer of the winning request to the central arbiter via request bus 806. Request bus activator 820 generates the enable signal upon receiving (1) an "i_win" signal indicating that this port is a winner of the external arbitration from internal arbiter activator 816, and (2) a no-back pressure indicator from back pressure module 818.

In one embodiment, arbitration system 800 also includes a reset logic 834 to address a delay problem which may cause one pending request to generate multiple pending request indicators. In one embodiment, reset logic 834, in response to receiving data identifying a winning request from internal arbiter 830 and an enable signal from internal arbiter activator 816, sends a reset signal to a flip-flop of pending request collector 812 and flip-flops of requestors $r_1$ through $r_n$ as will be described in more detail below in conjunction with FIG. 10.

It should be noted that the blocks shown in FIG. 8 illustrate various functions performed by arbitration system 800, rather than actual elements of arbitration system 800.

Figure 9:
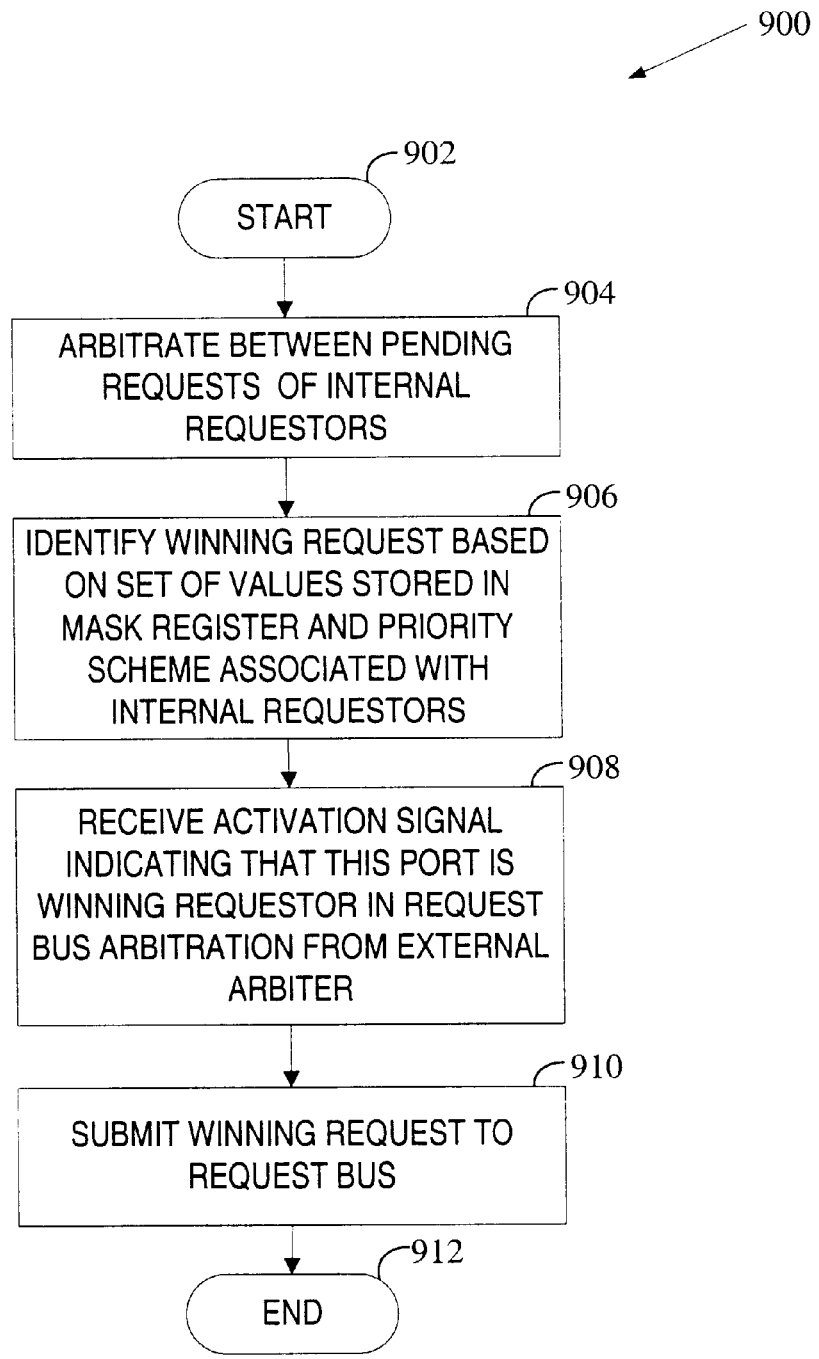
FIG. 9 is a flow diagram of a process for managing resource requests within a port of an interconnect device, according to one embodiment of the present invention.

FIG. 9 is a flow diagram of a process for managing resource requests within a port of an interconnect device, according to one embodiment of the present invention. The process may be performed by processing logic that may comprise hardware (e.g., circuitry, dedicated logic, etc.), software, or a combination of both.

Referring to FIG. 9, process 900 begins with arbitrating between pending requests of internal requestors residing in the port (processing block 904). At processing block 906, processing logic identifies a winning request based on a set of values stored in a mask register and a priority scheme associated with the plurality of internal requestors.

Next, at processing block 908, processing logic receives an activation signal from an external arbiter of the port. The activation signal indicates that this port is a winning requestor in a request bus arbitration performed by the external arbiter. In one embodiment, the activation signal also indicates that a no-back pressure indicator has been received from a central arbiter.

Further, the winning request is submitted to a request bus of the interconnect device upon receiving the activation signal from the external arbiter (processing block 910). In one embodiment, in response to the activation signal, processing logic also updates a mask register value corresponding to the internal requestor of the winning request.

Figure 10:
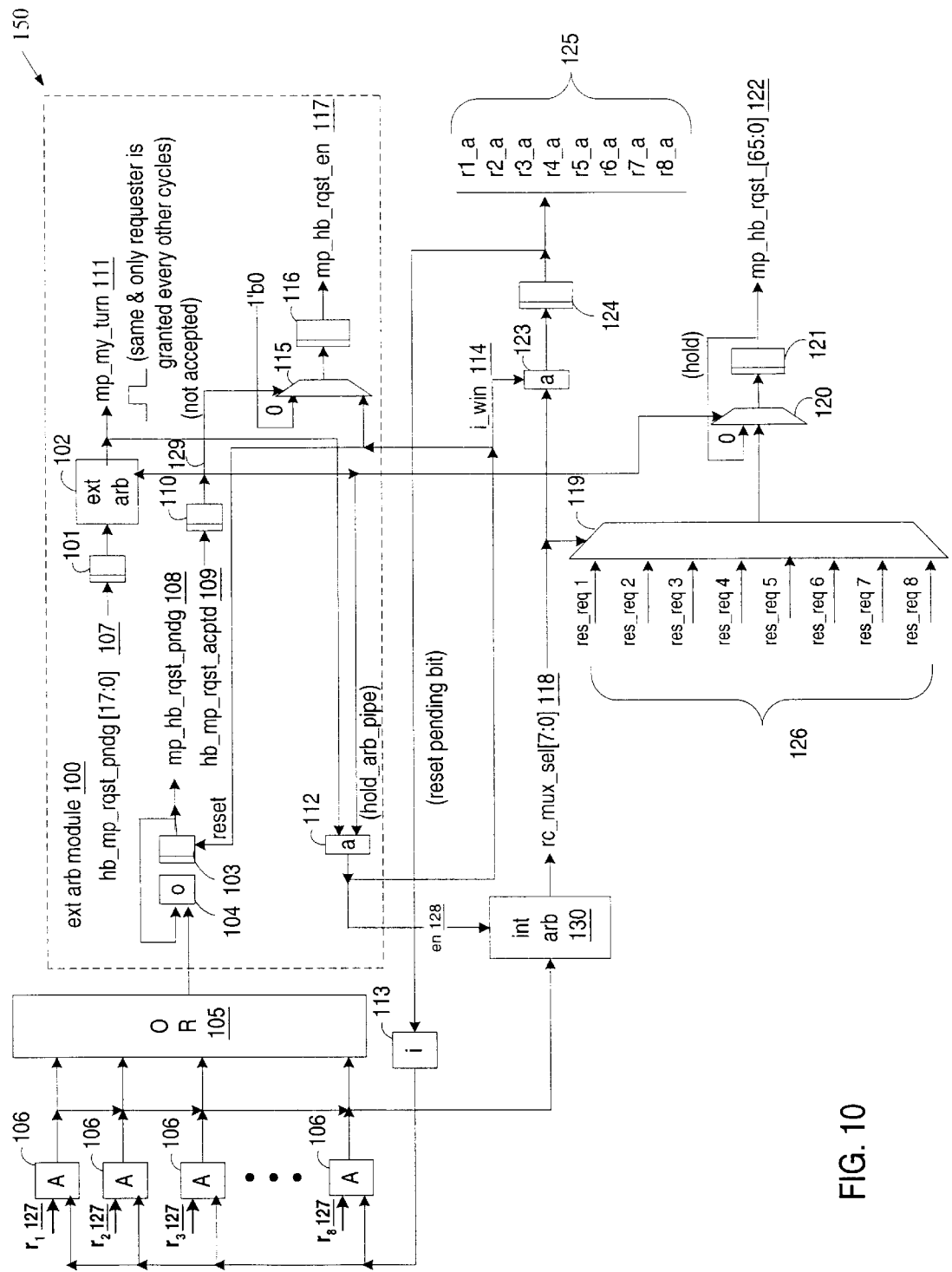
FIG. 10 is a block diagram of one embodiment of an arbitration system associated with a management port of an IBA switch.
Figure 11:
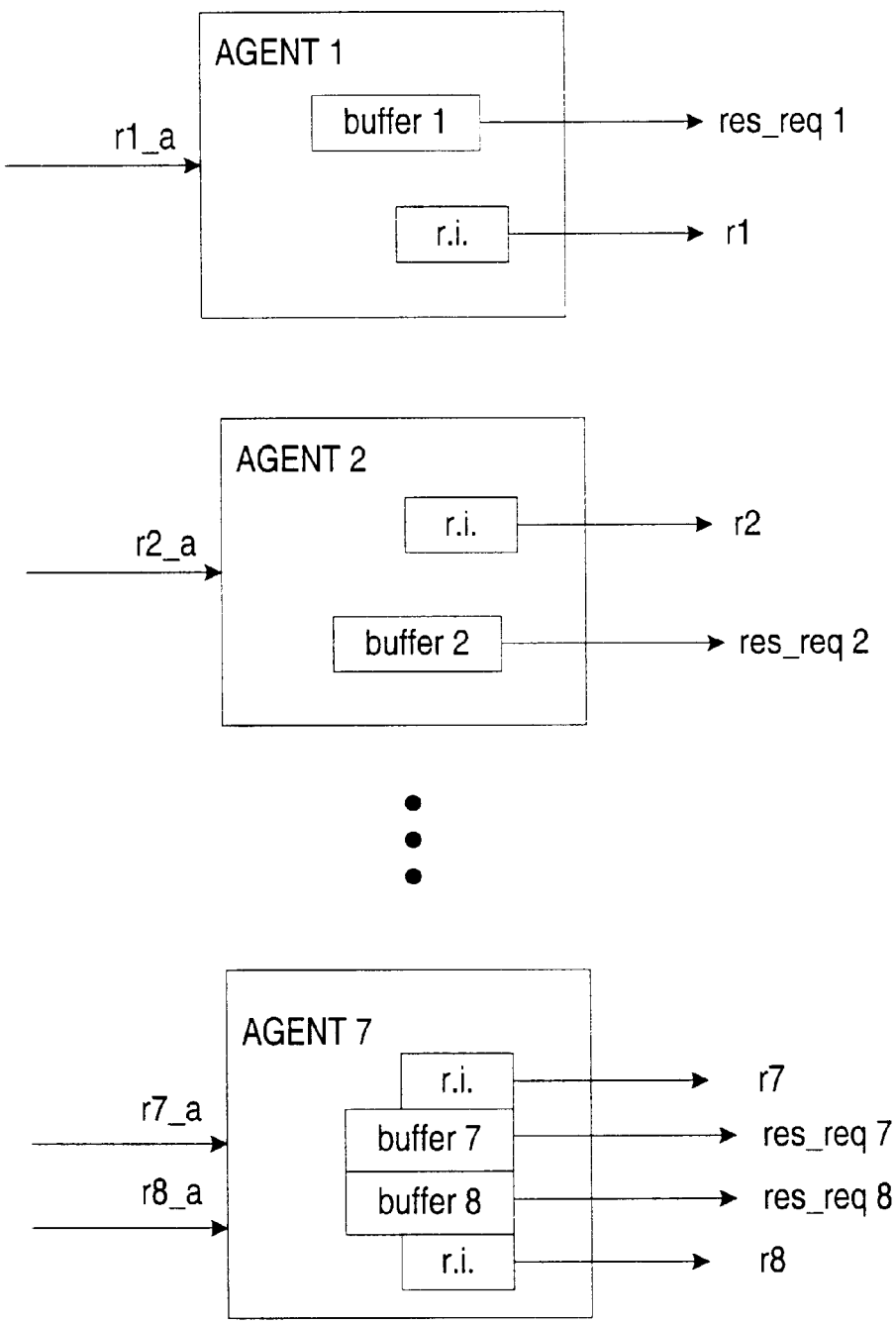
FIG. 11 illustrates an exemplary set of agents residing in a management port.

FIG. 10 is a block diagram of one embodiment of an arbitration system associated with a management port of an IBA switch. The management port includes a set of agents that are responsible for processing packets received at the port and storing the processed packets in corresponding buffers. FIG. 11 illustrates an exemplary set of agents residing in a management port.

Referring to FIG. 11, seven agents are shown to reside in the management port. The number of agents, however, may vary depending on a particular architecture of the management port. The agents process certain types of packets received at the port and generate resource requests for these packets. Resource requests are stored in one or more queues (i.e., buffers) of the agent. Once a resource request is placed in a queue, a pending request indicator is set in a corresponding request indicator register. For example, when agent 1 generates a resource request (res_req1), this resource request is kept in buffer 1 and a pending resource indicator r1 is set in a request indicator register 1. As will be described below, once any one of resource requests res_req1 through res_req8 is granted, an acknowledge indicator (e.g., r1_a) is generated and sent to a corresponding agent. Upon receiving this acknowledge indicator, the agent resets the value of the request indicator register.

Returning to FIG. 10, arbitration system 150 includes an external arbitration module 100 and an internal arbiter 130. Each of eight pending request indicators (r1 through r8) 127 generated by participating requestors (e.g., queues) of the management port are received by a corresponding AND gate 106. Although eight pending request indicators are shown, more or less pending request indicators may be generated depending on the number of agents residing in the management port and the number of queues associated with each agent.

AND gates 106 output pending request indicators to a register 103 via OR gates 105 and 104. Register 103 receives a single request indicator that specifies whether any one of the participating requestors has a pending resource request. This single indicator is sent to a transmitting end 108 of a pending request bus. As described above, the pending request bus collects pending request indicators from each port of the switch and delivers the collected data to each port. In a management port, this collected data received from a receiving end 107 of the pending request bus is placed in a register 101 and then used by an external arbiter 102 in external arbitration. The external arbitration is performed to allocate a turn to access the request bus to one of the participating ports.

The output of AND gate 106 is also received by an internal arbiter 130 which arbitrates between pending requests of participating requestors using a set of values stored in a mask register. In one embodiment, internal arbiter 130 also uses a priority scheme associated with the management port's queues as described in more detail above. Internal arbiter 130 generates a set of indicators 118 identifying a winner of the internal arbitration. This set of indicators is sent to an AND gate 123 for a subsequent reset processing and to logic 119. Logic 199 uses indicators 118 to select a winning resource request from resource requests 126 residing in different queues of the management port. The winning resource request is then sent to a multiplexer 120 for submission to a request bus 122.

When the port winning the external arbitration is the management port, mp_my_turn signal 111 is generated and sent to an AND gate 112. AND gate 112 receives a back pressure indicator (i.e., accepted/rejected signal) 129 from a back pressure bus 109 via a register 110. The back pressure indicator specifies whether the central arbiter of the switch has accepted or rejected the last resource request send by one of the ports, thereby indicating the inability of the central arbiter to accept resource requests from the ports as described in greater detail above. If AND gate 112 receives mp_my_turn signal 111 and an accepted signal (i.e., a no-back pressure indicator) 129, it sends an enable signal 128 to internal arbiter 130. In addition, AND gate 112 sends an i_win signal 114 to AND gate 123 and a request bus enable multiplexer 115, and a reset signal 130 to register 103.

Upon receiving enable signal 128, internal arbiter 128 updates the mask register. In addition, accepted signal 129 sent to multiplexer 120 triggers the transfer of the winning request to register 121. When multiplexer 115 receives signal 114 and accepted signal 129, it generates a request bus enable signal 117 that activates the transfer of the winning request from register 121 to the central arbiter via request bus 122.

In the meantime, reset signal 130 sent to register 103 resets the value in this register. The reset processing is needed to prevent a single pending request from issuing multiple requests to the central arbiter. That is, an initiator of a pending request goes through a two-stage pipeline in order to present a request to the external arbiter. Due to the timing constraint associated with the crossbar design, any switch component sending data to the crossbar must send it through a register. Similarly, any switch components receiving data from the crossbar must receive it from a register. These pipeline registers need to be reset once a request is granted so that a single pending request does not cause multiple resource requests to be sent to the central arbiter. Accordingly, register 103 used to send the pending request indicator to the pending request bus and register 101 used to receive the combined pending request data from the pending request bus may generate multiple requests. Register 103 is reset using reset signal 130. Register 101 does not need to be reset due to the mask-based arbitration technique used by external arbiter 102. Specifically, because external arbiter 102 arbitrates during one cycle and then updates its mask register during the next cycle, the combined pending request data stored in register 101 is ignored during this next cycle and cannot cause a problem.

In addition, i_win signal 114 sent to AND gate 123 causes the set of indicators 118 identifying the winner of the internal arbitration to be transferred to a register 124. An indicator associated with the winning requestor is then sent to a corresponding AND gate 106 via an inverter 113 to reset a pending request indicator generated by this AND gate 106. In addition, this indicator (an acknowledge bit 125) is sent to an associated agent to reset a value of an appropriate request indicator register as described above in conjunction with FIG. 10.

Thus, method and system to arbitrate resource requests of a plurality of ports within an interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An interconnect device comprising:
 a crossbar including a number of data buses, a request bus, and a grant bus;
 a central arbiter, coupled to the crossbar, to receive resource requests via the request bus and to send resource grants via the grant bus; and
 a plurality of ports, coupled to the crossbar, to send the resource requests to the arbiter via the request bus and to receive the resource grants from the arbiter via the grant bus, each of the plurality of ports including a pending request arbiter to allocate, at each arbitration, a turn to submit a resource request to the request bus to one of the plurality of ports based on a set of values stored in a mask register and a priority associated with each of the plurality of ports.

2. The device of claim 1 wherein each of the set of values in the mask register corresponds to a particular port of the plurality of ports and indicates whether the particular port is disqualified from further participation in a current round of arbitration.

3. The device of claim 2 wherein the particular port is disqualified from further participation in the current round of arbitration after winning one arbitration within the current round of arbitration.

4. The device of claim 1 wherein the crossbar further includes a pending request bus to collect a pending request indicator from each of the plurality of ports, and to deliver pending request data combining pending request indicators from the plurality of ports to the pending request arbiter in each of the plurality of ports.

5. The device of claim 4 wherein the pending request indicator indicates whether said each of the plurality of ports has one or more pending requests.

6. The device of claim 1 wherein the crossbar further comprises a request enabling bus to trigger a transmission of the resource request to the central arbiter via the request bus.

7. The device of claim 1 wherein the crossbar further comprises a back pressure bus to transfer a back pressure indicator from the central arbiter to the pending request arbiter in each of the plurality of ports.

8. The device of claim 7 wherein the pending request arbiter is to halt arbitration upon receiving the back pressure indicator from the back pressure bus.

9. The device of claim 1 wherein one or more of the plurality of ports include multiple queues to store pending requests and a lower level arbiter to arbitrate the pending requests from the multiple queues.

10. The device of claim 9 wherein each of the multiple queues is to send a request indicator to the request collecting bus via an OR gate.

11. The system of claim 9 wherein the lower level arbiter is to send a request winning in a current arbitration to the request bus upon receiving an enable signal from the pending request arbiter.

12. An arbitration system associated with one of a plurality of ports of an interconnect device, the system comprising:
 an internal arbiter to arbitrate between pending requests associated with a plurality of internal requestors residing in the one of the plurality of ports and to identify a winning request based on a set of values stored in a mask register and a priority scheme associated with the plurality of internal requestors; and
 an external arbitration module to allocate a turn for the one of the plurality of ports and to cause the internal arbiter to submit the winning request to a request bus of the interconnect device.

13. The system of claim 12 wherein the one of the plurality of ports is a management port of a switch.

14. The system of claim 13 wherein the plurality of internal requestors includes a group of management port agents.

15. The system of claim 12 wherein the external arbitration module comprises:
 a pending request collector to determine whether any one of the plurality of internal requestors has a pending request and to send a pending request indicator associated with the one of the plurality of ports to a pending request bus;
 an external arbiter to receive combined pending request data associated with the plurality of ports from the pending request bus, to arbitrate between pending requests of the plurality of ports and to generate data identifying a winner of an arbitration; and
 an internal arbiter activator to activate the internal arbiter upon receiving a signal indicating that the one of the plurality of ports is a winner of a current arbitration from the external arbiter.

16. The system of claim 15 wherein the external arbitration module further comprises:
a request bus activator to send an enable signal to the request bus to trigger the transfer of the winning request to the central arbiter via the request bus.

17. The system of claim 16 wherein the external arbitration module further comprises:
a back pressure module to receive a back pressure indicator from the central arbiter via a back pressure bus and to send the back pressure indicator to the internal arbiter activator and the request bus activator.

18. The system of claim 17 wherein the internal arbiter activator is to refrain from activating the internal arbiter upon receiving the back pressure indicator from the back pressure module.

19. The system of claim 17 wherein the request bus activator is to refrain from sending the enable signal to the request enable bus upon receiving the back pressure indicator from the back pressure module.

20. The system of claim 12 wherein the internal arbiter is to receive pending request indicators from the plurality of internal requestors and to select a winning request based on the set of values in the mask register and the priority scheme.

21. The system of claim 12 wherein the internal arbiter is to update the set of values in the mask register upon receiving an activation signal from the external arbitration module.

22. The system of claim 12 further comprising:
a reset logic to receive data identifying the winning request from the internal arbiter, to receive an activation signal from the external arbitration module, and in response to receiving the activation signal, to send a reset signal to an internal requestor of the winning request and to the external arbitration module.

23. The system of claim 12 wherein the external arbiter includes a second mask register to identify one or more of the plurality of ports that are qualified to participate in a current arbitration.

24. A method for arbitrating requests of a plurality of ports within an interconnect device, the method comprising:
receiving, at each of the plurality of ports, combined pending request data including a set of pending request indicators associated with the plurality of ports, each of the set of pending request indicators specifying whether a corresponding port of the plurality of ports has a pending request to be submitted to a request bus of the interconnect device; and
allocating, at each of the plurality of ports, a turn to submit a request to the request bus to one of the plurality of ports based on the combined pending request data, a set of values stored in a mask register and a priority scheme associated with the plurality of ports.

25. The method of claim 24 wherein each of the set of values in the internal mask register corresponds to a particular port of the plurality of ports and indicates whether the particular port is disqualified from a further participation in a current round of arbitration.

26. The method of claim 25 wherein the particular port is disqualified from further participation in the current round of arbitration after winning one arbitration within the current round of arbitration.

27. The method of claim 24 further comprising:
submitting a pending request indicator to a pending request bus by each of the plurality of ports.

28. The method of claim 24 further comprising:
generating an enable signal to trigger a transmission of the resource request to a central arbiter of the interconnect device via the request bus.

29. The method of claim 24 further comprising:
receiving, at each of the plurality of ports, a back pressure indicator from the central arbiter of the interconnect device; and
halting arbitration for a duration of the back pressure indicator at each of the plurality of ports.

30. The method of claim 24 wherein one of the plurality of ports includes multiple queues to store pending requests.

31. The method of claim 30 further comprising:
arbitrating the pending requests from the multiple queues to identify a winning request within the one of the plurality of ports; and
submitting the winning resource request to the request bus when the one of the plurality of ports is allocated a turn to submit a request to the request bus.

32. A method to manage resource requests within a port of an interconnect device, the method comprising:
arbitrating between pending requests associated with a plurality of internal requestors residing in the port;
identifying a winning request based on a set of values stored in a mask register and a priority scheme associated with the plurality of internal requestors;
receiving an activation signal from an external arbiter of the port, the activation signal indicating that the port is a winning requestor in a request bus arbitration; and
submitting the winning request to a request bus of the interconnect device.

33. The method of claim 32 wherein the one of the plurality of ports is a management port of a switch.

34. The method of claim 32 wherein the plurality of internal requestors includes a group of management port agents.

35. The method of claim 32 further comprising:
updating the set of values in the mask register upon receiving the activation signal from the external arbiter.

36. The method of claim 32 further comprising:
receiving a back pressure indicator from the external arbiter; and
refraining from the submission of the winning request to the request bus until receiving a no-back pressure indicator from the external arbiter.

37. The method of claim 32 further comprising:
sending a reset signal to a requestor of the winning request and to the external arbitration module.

38. A machine-readable medium storing a description of a circuit, said circuit comprising:
an internal arbiter to arbitrate between pending requests associated with a plurality of internal requestors residing in the one of the plurality of ports and to identify a winning request based on a set of values stored in a mask register and a priority scheme associated with the plurality of internal requestors; and
an external arbitration module to allocate a turn for the one of the plurality of ports and to cause the internal arbiter to submit the winning request to a request bus for a transfer to a central arbiter of the interconnect device.

39. The machine-readable medium of claim 38 wherein the description comprises a behavioral level description of the circuit.

40. The machine-readable medium of claim 39 wherein the behavioral level description is compatible with a VHDL format.

41. The machine-readable medium of claim 39 wherein the behavioral level description is compatible with a Verilog format.

42. The machine-readable medium of claim 38 wherein the description comprises a register transfer level netlist.

43. The machine-readable medium of claim 38 wherein the description comprises a transistor level netlist.

* * * * *